United States Patent
Mannengal et al.

(10) Patent No.: US 12,204,634 B2
(45) Date of Patent: Jan. 21, 2025

(54) SECURE DEVICE TRACKING VIA DEVICE OWNERSHIP SERVICE

(71) Applicant: Microsoft Technology Licensing, LLC, Redmond, WA (US)

(72) Inventors: Arun Mannengal, Sammamish, WA (US); Rajesh Kumaraswamy, Bothell, WA (US); Chandra Sekhar Surapaneni, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 17/841,360

(22) Filed: Jun. 15, 2022

(65) Prior Publication Data
US 2023/0409694 A1    Dec. 21, 2023

(51) Int. Cl.
*G06F 21/44*    (2013.01)

(52) U.S. Cl.
CPC .................................. *G06F 21/44* (2013.01)

(58) Field of Classification Search
None
See application file for complete search history.

(56) References Cited

U.S. PATENT DOCUMENTS

| | | | |
|---|---|---|---|
| 11,616,650 B1* | 3/2023 | Panjwani | H04L 9/3247 |
| | | | 713/168 |
| 2017/0163733 A1* | 6/2017 | Grefen | H04L 9/3236 |
| 2017/0366347 A1* | 12/2017 | Smith | H04L 9/3247 |
| 2018/0119975 A1* | 5/2018 | Park | G06F 21/602 |
| 2019/0303553 A1* | 10/2019 | Choiniere | G06F 21/32 |
| 2019/0372777 A1* | 12/2019 | Choi | H04L 9/30 |
| 2020/0117690 A1* | 4/2020 | Tran | G06F 16/90332 |
| 2021/0021432 A1* | 1/2021 | Atkins | H04L 9/50 |
| 2022/0198441 A1* | 6/2022 | Dalton | G06Q 20/0658 |

OTHER PUBLICATIONS

"International Search Report and Written Opinion issued in PCT Application No. PCT/US23/022304", Mailed Date: Aug. 25, 2023, 10 Pages.

\* cited by examiner

*Primary Examiner* — Kaveh Abrishamkar
(74) *Attorney, Agent, or Firm* — Schwegman Lundberg & Woessner, P.A.

(57) ABSTRACT

A computer implemented method includes receiving a request for device validation, reading a genesis record from a device, the genesis record containing a device identification (ID), an original owner ID, a current owner ID, and a first hash of the device ID, an original owner ID, a current owner ID, and validating, by multiple processing entities having replicated copies of a chain that includes the genesis record and a succeeding transfer block, ownership of the device.

20 Claims, 5 Drawing Sheets

SECURE DEVICE TRACKING VIA DEVICE OWNERSHIP SERVICE

BACKGROUND

Maintaining computing resources, such as cloud service computing resources can result in devices being added to the computing resources. Such devices may include storage devices, network cards, processors, and other devices that may contain programming code. It can be difficult to track the provenance of the devices to ensure the devices can be trusted for use in maintaining equipment and are less likely to contain malicious code.

SUMMARY

A computer implemented method includes receiving a request for device validation, reading a genesis record from a device, the genesis record containing a device identification (ID), an original owner ID, a current owner ID, and a first hash of the device ID, an original owner ID, a current owner ID, and validating, by multiple processing entities having replicated copies of a chain that includes the genesis record and a succeeding transfer block, ownership of the device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Tracking of devices, for use in maintaining cloud computing resources in data centers, can be time consuming and error prone. It can be important to trust that such devices were manufactured by trusted manufactures, and to track ownership of such devices prior to their use in maintaining such cloud computing resources. Such tracking can help ensure devices have not been tampered with and that their use in maintaining the cloud computing resources or other equipment will not have adverse effects. Adverse effects may be caused by malicious code, device vulnerabilities (e.g., from devices that do not have up to date code), spoofing, or counterfeit devices that may not have the capabilities expected, which can degrade performance. Effective tracking an also ensure proper tracking of licensing conditions, such as leasing or royalty payments.

Figure 1:
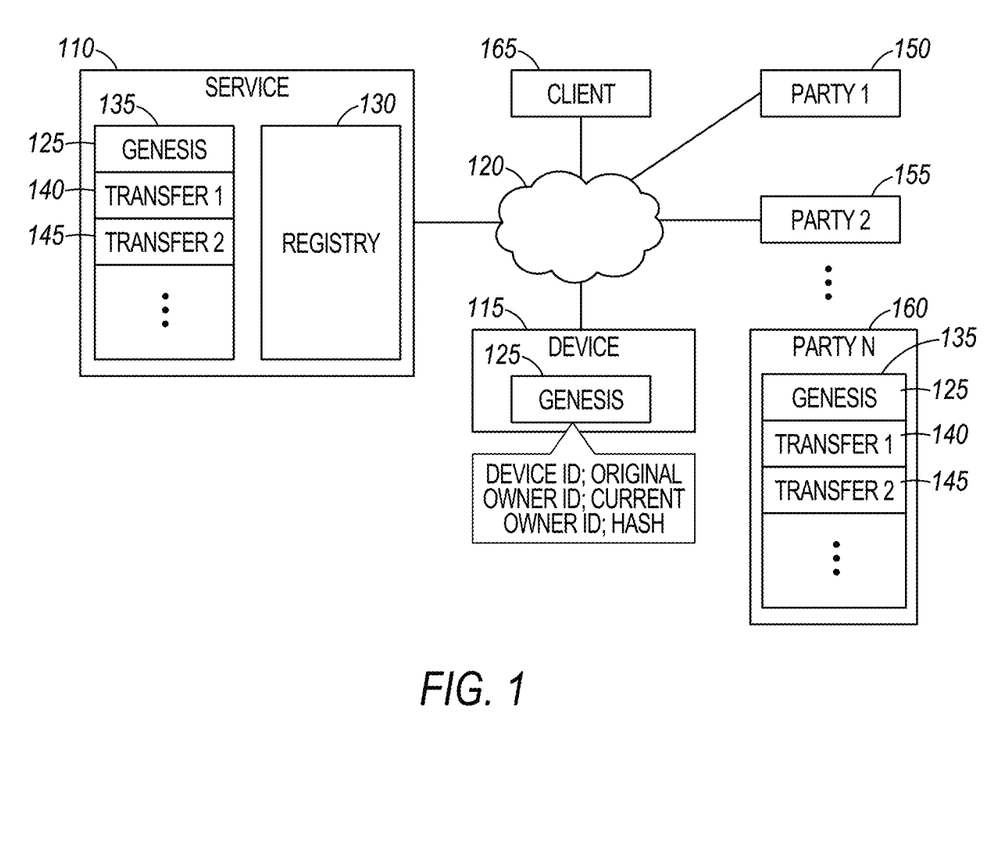
FIG. 1 is a block diagram of a system for performing secure transfer and tracking of devices according to an example embodiment.

FIG. 1 is a block diagram of a system 100 for performing secure transfer and tracking of devices. The transfer and tracking of the devices allows ownership of the devices to be validated which can increase trust in the devices. System 100 may include a service, such as a cloud-based service 110 for device 115 tracking. While one device 115 is shown, the system 100 may track more than one device. In one example, the service 110 is coupled to the device 115 via a network 120, such as the Internet. The device 115 may include a genesis record 125 stored in a read only memory. The genesis record 125 is a digital representation of a device ID; an original owner ID, a current owner ID; and a hash of the combined device ID, an original owner ID, and a current owner ID. Each device has a unique genesis record 125, which may be several bytes, 16 bytes or longer for example, in length.

In the genesis record 125, the original owner may be a manufacturer of the device 115 with the current owner being a first customer that receives the device 115 from the original owner associated with the original owner ID. In one example, the manufacturer may be a trusted manufacturer. There may be many trusted manufacturers that provide data to the service 110 allowing the service 110 to establish a registry 130 of trusted devices. Each manufacturer may provide lists of certified devices with information about the devices, including the device ID, make, model, and other identifying information. The lists and information may be stored in the registry 130 and used to identify trusted devices that are effectively certified, such as by including only trusted manufacturers or sources of devices on the registry 130.

In one example, the genesis record 125 is used as the initial or first block of a chain 135 of blocks. Each transfer of the device 115 to a new owner adds a transfer block 140, 145 to the chain 135. Each device 115 has a separate chain, which is an immutable record of ownership of the corresponding device.

Transfer block 140, sometimes called "block 2" corresponds to a first transfer, "Transfer 1", and includes information about the current owner X, and a new owner Y with a hash of that "Data" and the hash value from the previous block, the genesis record 125 in this case:

```
"Data":{
"From":<OwnerX>,"To":<OwnerY>
}
"HashValue":{ hash(Data)},
"PreviousHashValue": <HashValue of previous block1>
```

Transfer block 145 corresponds to a second transfer, "Transfer 2", and includes information about the current owner Y, and a new owner Z with a hash of that "Data" and the hash value from the previous block (block 2 in this case):

```
"Data":{
"From":<OwnerX>,"To":<OwnerY>
}
"HashValue":{ hash(Data)},
"PreviousHashValue": <HashValue of previous block2>
```

The chain 135 may be replicated to multiple parties as indicated at 150, 155, and 160. The chain 135 is a private blockchain in one example and is part of an immutable ownership record that is decentralized. The private blockchain, chain 135, is permissioned and controlled by the system 100. The chain 135 may be a binary tree, such as a Merkle tree for encoding blockchain data. In combination with the genesis record 125, free movement of the device 115 between owners is permitted. The parties may be trusted parties or may utilize untrusted parties with sufficient algorithms in place to trust the result verifications of the parties. Given the distribution of the chain 135, it is nearly impossible to surreptitiously modify the ownership record memorialized by the chain 135.

Service 110 may receive authentication requests from a client 165 to authenticate a device as being owned by a current owner or transfer a device to a new owner. Responsive to the request, service 110 connects to device 115 (e.g., in a secure manner) to obtain the genesis record 125. A handshake may be performed in a secure manner to allow only authorized access to the genesis record 125. Various examples include the use of a trusted platform module (TPM) chip, the use of symmetric keys or certificates, or any other secure method of accessing the genesis record.

The device ownership is then verified, by the service 110 and parities 150, 155, and 160, based on the genesis record 125 and the chain 135 and using known blockchain mechanisms to ensure the hashes and information in the chain 135 are valid.

The devices, such as the device 115, may include any type of processing device in further examples, such as internet of things devices that may be coupled to processing devices.

Figure 2:
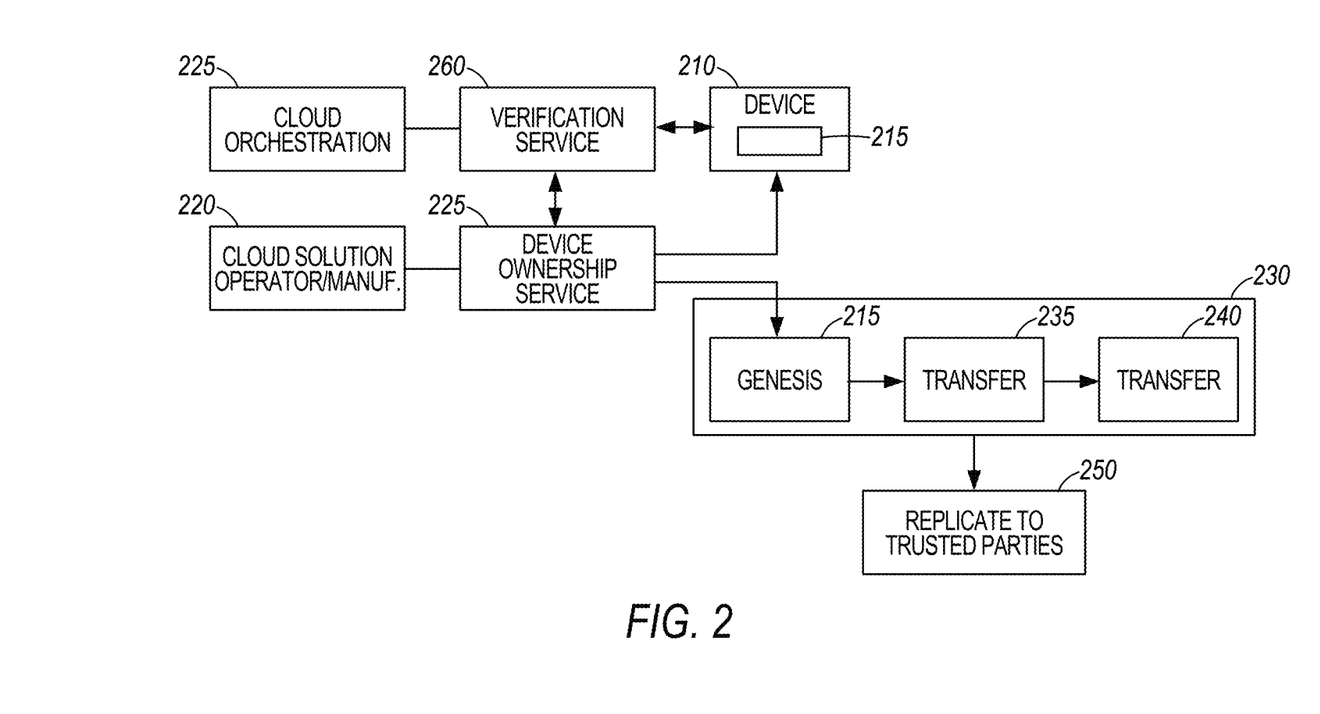
FIG. 2 is a block diagram of a system architecture for tracking device ownership according to an example embodiment.

FIG. 2 is a block diagram of a system architecture 200 for tracking device ownership. A device 210 has a genesis record 215 written into it by a manufacturer prior to shipping the device to a first customer. As indicated above, the genesis record 215 is a first block "block 1" that contains a device identifier, a manufacturer identifier (the first owner) and the first owner (customer) identifier as well as a hash of that information. In one example the genesis record is generated and written to the device by a manufacturer and is registered via cloud solution operator interface 220 to a cloud device ownership service 225. The hash may be generated by any reliable hash generator, such as MD5, SHA1, SHA3, CRC32, or others.

The ownership service 225 may have authorized access to device 210 read only memory to read the genesis record.

In one example, the genesis record 215 serves as a first block of a chain 230 generated by the device ownership service 225. As transfers of the device 210 to new owners occur, an additional transfer block 235, 240 for each transfer may be generated by device ownership service 225 and added to the chain 230. Each additional transfer block includes IDs of the current and new owners, "Data", a hash of the Data, and the hash of the previous block. The chain 230 is replicated to multiple trusted devices 250 for use in verification of the device.

A cloud orchestrator interface 255 is used to receive requests for device verification for a verification service 260. Interface 255 may allow searching for devices based on one of more of device ID, make, model, and manufacturer in one example. Searching may result in a list of devices meeting the search to be presented, allowing a user to select the device to verify. Verification requests are then processed by the device ownership service 225 using the chain 135 and trusted parties 250 to validate that the device ownership is consistent and in accordance with the registry 130 of trusted devices.

In the case of a transfer request, which may be received via interfaces 220 or 255, the verification service 260 may be used to request and receive validation of ownership of the device 210 from device ownership service 225. Device ownership service 225 then exposes the latest state of the device 210, generates a new transfer block, and persists the transfer block onto the chain 230, which is then replicated to the multiple trusted devices 250.

Figure 3:
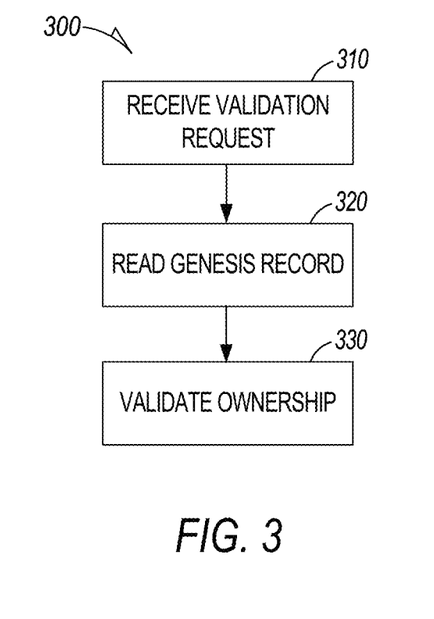
FIG. 3 is a flowchart of a computer implemented method of validating device ownership according to an example embodiment.

FIG. 3 is a flowchart of a computer implemented method 300 of validating device ownership. Method 300 begins at operation 310 by receiving a request for device validation. In one example, the request for device validation may include a request for transfer of the device to a new owner. A genesis record may be read from the device at operation 320. Reading a genesis record from the device comprises verifying that an originator of a read request is authorized to read the block record prior to reading the block record.

The genesis record contains a device ID, an original owner ID, a current owner ID, and a first hash of the device ID, an original owner ID, and a current owner ID. Ownership of the device is validated at operation 330 via a chain that includes the genesis record, a succeeding transfer block, and multiple processing entities having replicated copies of the chain. The chain further comprises multiple transfer records each including a previous owner ID, a new owner ID, a corresponding hash of the current owner ID and the new owner ID, and a hash of an immediately preceding record, forming a private blockchain for the device.

Figure 4:
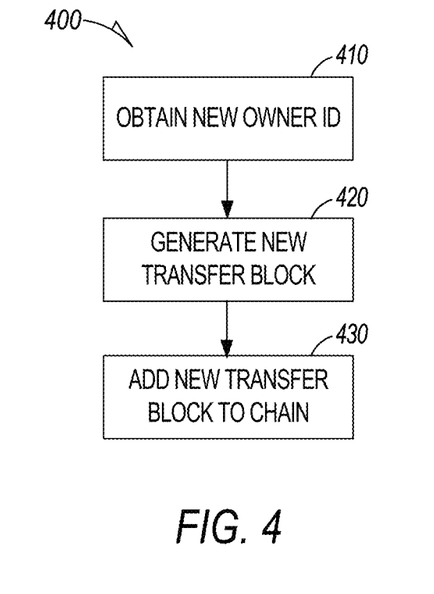
FIG. 4 is a flowchart illustrating a method of generating a new transfer block for an ownership chain according to an example embodiment.

FIG. 4 is a flowchart illustrating a method 400 of generating a new transfer block for an ownership chain. At operation 410, a new owner ID from a request is obtained. A new transfer block is generated at operation 420. The new transfer block includes the current owner ID, the new owner ID, a second hash of the current owner ID and the new owner ID, and the first hash. At operation 430, the new transfer block record is added to the chain to form a private block chain for the device. The private block chain for the device is replicated to the multiple processing entities. The multiple processing entities may be trusted parties, allowing the private block chain to be an immutable record of device ownership.

Figure 5:
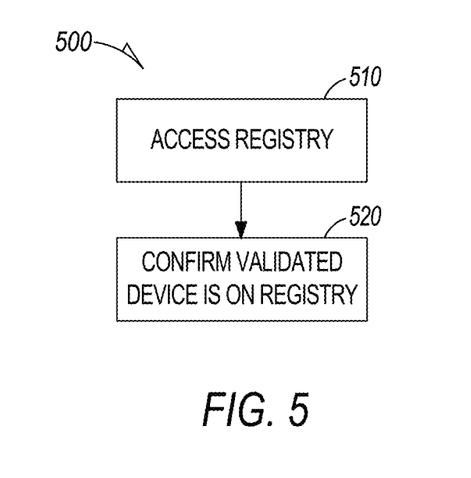
FIG. 5 is a flowchart illustrating a method of verifying that a validated device can be trusted according to an example embodiment.

FIG. 5 is a flowchart illustrating a method 500 of verifying that a validated device can be trusted. Method 500 begins (e.g., following device validation) by accessing a registry of certified devices at operation 510. The list is checked at operation 520 to confirm that the validated device is on the registry of certified devices. The registry of certified devices may be generated from data of manufactured devices provided by trusted device manufacturers.

Figure 6:
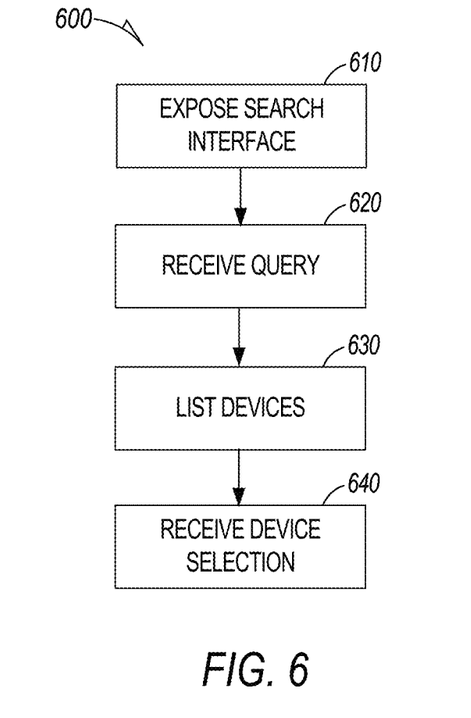
FIG. 6 is a flowchart illustrating a method of receiving a request for device validation according to an example embodiment.

FIG. 6 is a flowchart illustrating a method 600 of receiving a request for device validation. A search interface for querying for devices is exposed at operation 610. Operation 620 includes receiving a query for the device. Operation 630 includes listing one or more devices obtained from a search of a device registry. At operation 640, a selection of the device from the list of one or more devices is received.

Figure 7:
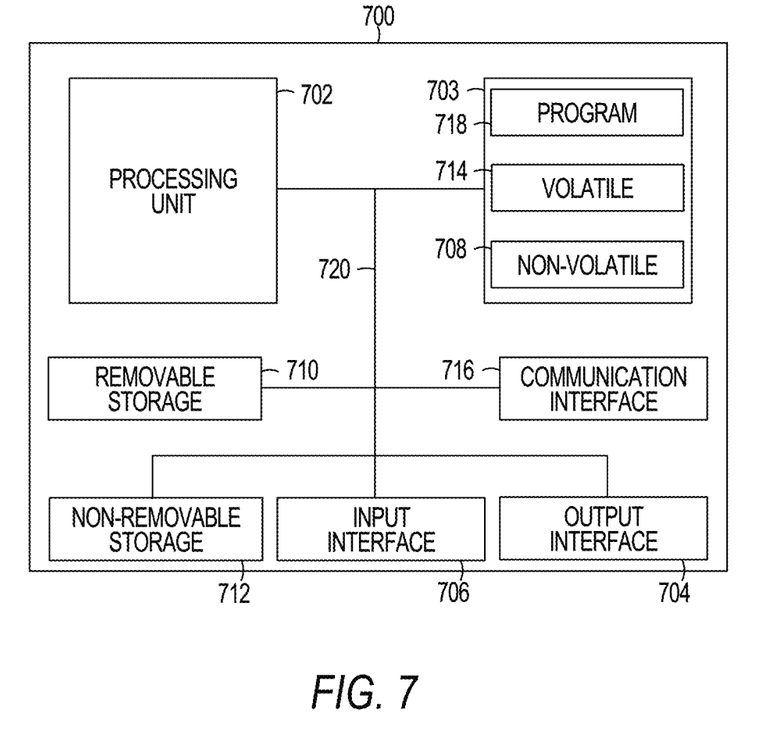
FIG. 7 is a block schematic diagram of a computer system to implement one or more example embodiments.

FIG. 7 is a block schematic diagram of a computer system 700 to implement devices and services to perform methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular. Wi-Fi. Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN).

Computer program 718 along with the workspace manager 722 may be used to cause processing unit 702 to perform one or more methods or algorithms described herein.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component." "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Examples

1. A computer implemented method includes receiving a request for device validation, reading a genesis record from a device, the genesis record containing a device identification (ID), an original owner ID, a current owner ID, and a first hash of the device ID, an original owner ID, a current owner ID, and validating, by multiple processing entities having replicated copies of a chain that includes the genesis record and a succeeding transfer block, ownership of the device.

2. The method of example 1 wherein the request for device validation includes a request for transfer of the device to a new owner.

3. The method of example 2 and further including obtaining a new owner ID from the request and generating a new transfer block that includes the current owner ID, the new owner ID, a second hash of the current owner ID and the new owner ID, and the first hash.

4. The method of example 3 wherein the new transfer block record is added to the chain to form a private block chain for the device.

5. The method of example 4 and further including replicating the private block chain for the device to the multiple processing entities.

6. The method of example 5 wherein the private block chain includes an immutable record of device ownership.

7. The method of example 5 wherein the multiple processing entities are trusted parties.

8. The method of any of examples 1-7 and further including accessing a registry of certified devices and confirming that the device is on the registry of certified devices.

9. The method of example 8 wherein the registry of certified devices is initiated from data of manufactured devices provided by trusted device manufacturers.

10. The method of any of examples 1-7 wherein reading a genesis record from the device includes verifying that an originator of a read request is authorized to read the block record prior to reading the block record.

11. The method of any of examples 1-7 wherein receiving a request for device validation includes exposing a search interface for querying for devices, receiving a query for the device, listing one or more devices obtained from a search of a device registry, and receiving a selection of the device from the list of one or more devices.

12. The method of any of examples 1-7 wherein the chain further comprises multiple transfer records, each including a previous owner ID, a new owner ID, a corresponding hash of the current owner ID and the new owner ID, and a hash of an immediately preceding record, forming a private blockchain for the device.

13. A machine-readable storage device has instructions for execution by a processor of a machine to cause the processor to perform operations to perform any of the methods of examples 1-12.

16. A device includes a processor and a memory device coupled to the processor and having a program stored thereon for execution by the processor to perform operations to perform any of the methods of examples 1-12.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving a request for validation of a device;
   reading a genesis record from the device, the genesis record containing a device identification (ID), an original owner ID, a current owner ID, and a first hash of the device ID, the original owner ID, and the current owner ID; and
   validating, by multiple processing entities having replicated copies of a chain that includes the genesis record and a succeeding transfer block, ownership of the device.

2. The method of claim 1 wherein the request for device validation includes a request for transfer of the device to a new owner.

3. The method of claim 2 and further comprising:
   obtaining a new owner ID from the request; and
   generating a new transfer block record that includes the current owner ID, the new owner ID, a second hash of the current owner ID and the new owner ID, and the first hash.

4. The method of claim 3 wherein the new transfer block record is added to the chain to form a private block chain for the device.

5. The method of claim 4 and further comprising replicating the private block chain for the device to the multiple processing entities.

6. The method of claim 5 wherein the private block chain comprises an immutable record of device ownership.

7. The method of claim 5 wherein the multiple processing entities are trusted parties.

8. The method of claim 1 and further comprising:
   accessing a registry of certified devices; and
   confirming that the device is on the registry of certified devices.

9. The method of claim 8 wherein the registry of certified devices is initiated from data of manufactured devices provided by trusted device manufacturers.

10. The method of claim 1 wherein reading a genesis record from the device comprises verifying that an originator of a read request is authorized to read the block record prior to reading the block record.

11. The method of claim 1 wherein receiving a request for device validation comprises:
   exposing a search interface for querying for devices;
   receiving a query for the device;
   listing one or more devices obtained from a search of a device registry; and
   receiving a selection of the device from the list of one or more devices.

12. The method of claim 1 wherein the chain further comprises multiple transfer records, each including a previous owner ID, a new owner ID, a corresponding hash of the current owner ID and the new owner ID, and a hash of an immediately preceding record, forming a private blockchain for the device.

13. A machine-readable storage device having instructions for execution by a processor of a machine to cause the processor to perform operations to perform a method, the operations comprising:
   receiving a request for validation of a device;
   reading a genesis record from the device, the genesis record containing a device identification (ID), an original owner ID, a current owner ID, and a first hash of the device ID, the original owner ID, and the current owner ID; and
   validating, by multiple processing entities having replicated copies of a chain that includes the genesis record and a succeeding transfer block, ownership of the device.

14. The device of claim 13 wherein the request for device validation includes a request for transfer of the device to a new owner, and wherein the operations further comprise:
  obtaining a new owner ID from the request;
  generating a new transfer block record that includes the current owner ID, the new owner ID, a second hash of the current owner ID and the new owner ID, and the first hash; and
  adding the new transfer block record to the chain to form a private block chain for the device.

15. The device of claim 14 wherein the operations further comprise replicating the private block chain for the device to the multiple processing entities.

16. The device of claim 13 wherein the operations further comprise:
  accessing a registry of certified devices; and
  confirming that the device is on the registry of certified devices.

17. The device of claim 13 wherein reading a genesis record from the device comprises verifying that an originator of a read request is authorized to read the block record prior to reading the block record.

18. The device of claim 13 wherein receiving a request for device validation comprises:
  exposing a search interface for querying for devices;
  receiving a query for the device;
  listing one or more devices obtained from a search of a device registry; and
  receiving a selection of the device from the list of one or more devices.

19. A device comprising:
  a processor; and
  a memory device coupled to the processor and having a program stored thereon for execution by the processor to perform operations comprising:
  receiving a request for validation of a device;
  reading a genesis record from the device, the genesis record containing a device identification (ID), an original owner ID, a current owner ID, and a first hash of the device ID, the original owner ID, and the current owner ID; and
  validating, by multiple processing entities having replicated copies of a chain that includes the genesis record and a succeeding transfer block, ownership of the device.

20. The device of claim 19 wherein the request for device validation includes a request for transfer of the device to a new owner, and wherein the operations further comprise:
  obtaining a new owner ID from the request;
  generating a new transfer block record that includes the current owner ID, the new owner ID, a second hash of the current owner ID and the new owner ID, and the first hash;
  adding the new transfer block record to the chain to form a private block chain for the device; and
  replicating the private block chain for the device to the multiple processing entities.

* * * * *